United States Patent [19]

Murty

[11] Patent Number: 4,815,575

[45] Date of Patent: Mar. 28, 1989

[54] ELECTRIC, VARIABLE DAMPING VEHICLE SUSPENSION

[75] Inventor: Balarama V. Murty, Sterling Heights, Mich.

[73] Assignee: General Motors Corporation, Detroit, Mich.

[21] Appl. No.: 177,376

[22] Filed: Apr. 4, 1988

[51] Int. Cl.[4] .................. B60G 17/00; F16F 9/06
[52] U.S. Cl. ........................ 188/299; 280/707
[58] Field of Search .......... 280/707, 690, 688; 188/299; 364/424, 434

[56] References Cited

U.S. PATENT DOCUMENTS

| | | | |
|---|---|---|---|
| 3,559,027 | 1/1971 | Arsem | 320/61 |
| 3,803,906 | 4/1974 | Ross | 73/90 |
| 3,861,487 | 1/1975 | Gill | 180/65 |
| 3,921,746 | 11/1975 | Lewus | 180/53 |
| 3,981,204 | 9/1976 | Starbard | 74/34 |
| 4,032,829 | 6/1977 | Schenavar | 320/61 |
| 4,103,532 | 8/1978 | Buzzi | 73/11 |
| 4,313,529 | 2/1982 | Kooto et al. | 188/299 |
| 4,355,532 | 10/1982 | Ikeda et al. | 73/11 |
| 4,426,683 | 1/1984 | Kissell | 364/508 |
| 4,726,453 | 2/1988 | Obotfelder et al. | 280/707 |
| 4,729,459 | 3/1988 | Inagaki et al. | 188/299 |

FOREIGN PATENT DOCUMENTS

| | | | |
|---|---|---|---|
| 2594755 | 8/1987 | France | 188/299 |
| 1084510 | 4/1984 | U.S.S.R. | |

Primary Examiner—David M. Mitchell
Assistant Examiner—Ross Weaver
Attorney, Agent, or Firm—Robert M. Sigler

[57] ABSTRACT

An electric, variable damping suspension for a motor vehicle comprises a three phase rotary electric alternator, a ball screw and nut apparatus connecting the sprung and unsprung masses and driving the alternator in alternating rotary directions as the sprung and unsprung masses oscillate relative to each other, a rectifier bridge for converting the three phase alternator output to a single DC current, an electric load, and a switch for controlling the application of the DC current to the electrical load. Circuits determine the times of consecutive zero crossings of each phase and update therefrom a signal indicative of the magnitude of rattle space velocity. The circuits further determine, from the identities of the alternator phases of successive zero crossings of any phase compared with stored expected consecutive phase identities, the direction of the rattle space velocity. A chopping control circuit is responsive to the magnitude and direction signals of rattle space velocity to control the switch in a variable duty cycle operation to vary the average current through the electric load and thus the damping force of the suspension. An additional circuit may be responsive to the current through the electric load to generate a signal indicative of the actual damping force of the suspension.

3 Claims, 3 Drawing Sheets

ELECTRIC, VARIABLE DAMPING VEHICLE SUSPENSION

BACKGROUND OF THE INVENTION

This invention relates to suspension apparatus for a motor vehicle and particularly to such a suspension having variable damping capability. The apparatus uses electrical damping by converting the vertical motion between sprung and unsprung masses into rotational motion in a multiphase alternator to generate an electric current in series with a variable electric load. As the current through the load is varied in response to a control signal, so is the damping of the suspension apparatus.

Electrical damping apparatus is not new in the broad sense. The U.S. Pat. No. 3,559,027 to Arsem, issued Jan. 26, 1971, shows a shock absorber for a motor vehicle which converts the linear suspension travel into rotary motion to activate a rotary electric generator, the output of which may be provided to a resistive load which may be varied to control the damping force of the apparatus. However, this prior publication does not show any control apparatus for varying the damping as the vehicle is operated and particularly does not show any recognition that the electrical apparatus may, if correctly designed, serve as the source of measurable vehicle suspensions parameters for inputs to such a control which eliminates the need for additional sensors. Other patents showing electrical shock absorbers, such as Starbard U.S. Pat. No. 3,981,204, issued Sept. 21, 1976, Schenevar U.S. Pat. No. 4,032,829 issued June 28, 1977, Gill U.S. Pat. No. 3,861,487, issued Jan. 21, 1975, and Lewus U.S. Pat. No. 3,921,746, issued Nov. 25, 1975, disclose the same or less. They, like Arsem, are primarily concerned with the generation of auxiliary power from such suspension movements for energy saving and only incidentally, if at all, mention the damping produced in the operation of the systems.

SUMMARY OF THE INVENTION

The suspension apparatus of this invention comprises, in combination, a multiphase rotary electric alternator, a ball screw and nut apparatus connecting the sprung and unsprung masses and driving the alternator in one rotary direction and the other as the sprung and unsprung masses move relatively in one vertical direction or the other, a rectifier bridge for converting the multiphase alternator output to a single DC current, an electric load, and a switch for controlling the application of the DC current to the electric load.

It further comprises first circuit means responsive to at least a first phase of the multiphase alternator to sense the zero crossings of the first phase and generate therefrom a signal indicative of the magnitude of the rattle space velocity, second circuit means responsive to at least a second phase of the multiphase alternator to sense the zero crossings thereof and indicate, in relation to the zero crossings of the first phase, the direction of the rattle space velocity and a chopping control circuit responsive to the signals from the first and second circuit means for controlling the switch in a variable duty cycle operation to vary the average current through the electric load and thus the damping force of the suspension with the velocity and direction of suspension travel. It may further comprise third circuit means responsive to the current through the electric load to generate a signal indicative of the damping force of the suspension.

The apparatus may be used as a programmable shock absorber with a control generated force/velocity curve and has potential for use in a full state semi-active suspension control. A preferred embodiment uses a three phase alternator with the magnitude and direction of rattle space velocity signals updated by all three phases for improved resolution. Further details and advantage of the invention will be apparent from a accompanying drawings and following description of a preferred embodiment.

DESCRIPTION OF THE PREFERRED EMBODIMENT

Figure 1:
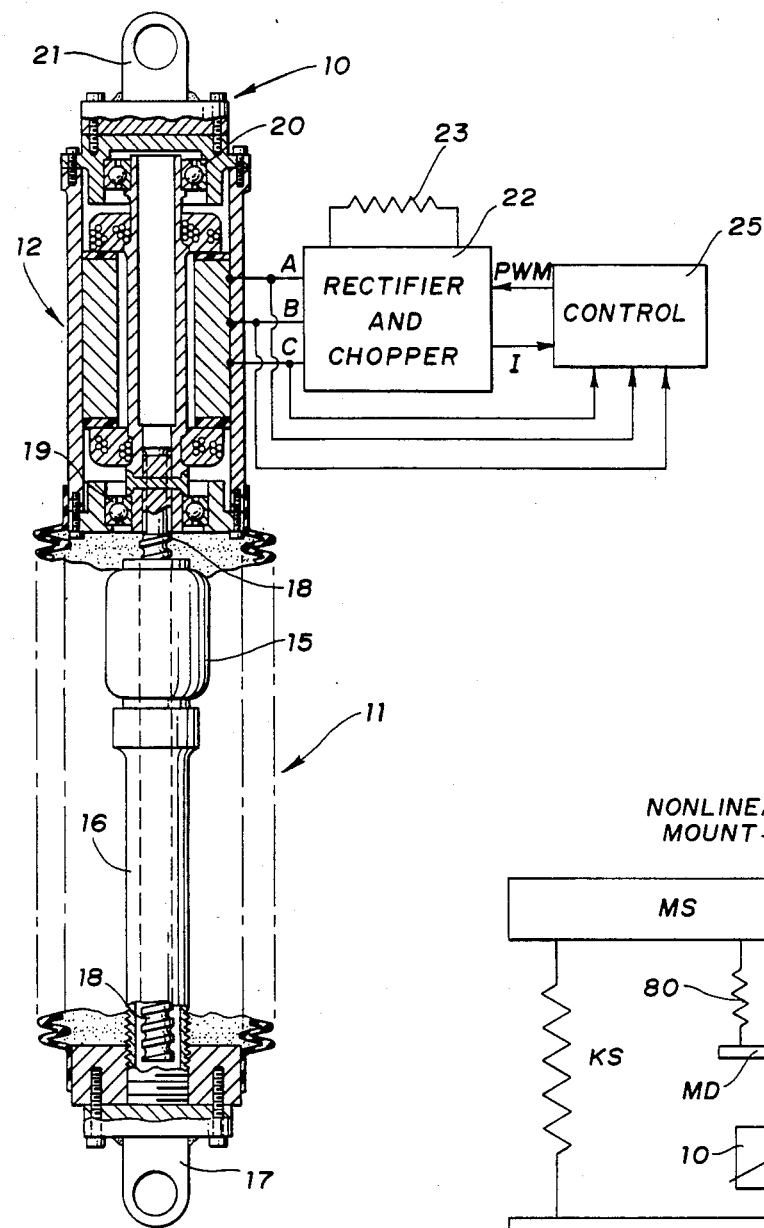
FIG. 1 shows a damper and control for a vehicle suspension apparatus according to the invention.

Referring to FIG. 1, a suspension unit 10 comprises a linear to rotary motion converter 11 and a rotary multiphase alternator 12. The linear to rotary motion converter 11 is a ball screw and nut apparatus in which a ball screw cage 15 is connected by a hollow, rigid connector 16 to a lower mounting means 17, which may be connected to the lower control arm of a vehicle wheel support, part of unsprung mass MU in FIG. 3. A screw 18 is rotatably attached through bearing assemblies 19 and 20 to an upper mounting means 21, which may be connected, through additional apparatus to be described, to the vehicle body, shown as mass MS in FIG. 3. Screw 18 is forced to move axially with the vehicle body relative to the lower control arm and thus moves back and forth axially with suspension travel through ball screw cage 15. As screw 18 moves axially through ball screw cage 15 it is forced to rotate, the direction of rotation being determined by the direction of linear motion.

Screw 18 carries the armature of three phase alternator 12, the electric output of which is generated with rotation of the armature by screw 18 and is provided through output connectors A, B and C to rectifier and chopper apparatus 22 and an associated electrical load resistor 23 (1.67 ohms, 150 W). A control 25 receives phase voltage signal F from connectors B and C, signal F' from connectors A and C and signal F" from connectors A and B. From these signals, control 25 derives signals representing rattle space velocity magnitude and direction as described hereinafter. Control 25 may further receive a load current signal I indicative of damping force from rectifier and chopper apparatus 22 and provides a damping force determining PWM signal to rectifier and chopper apparatus 22.

Figure 2:
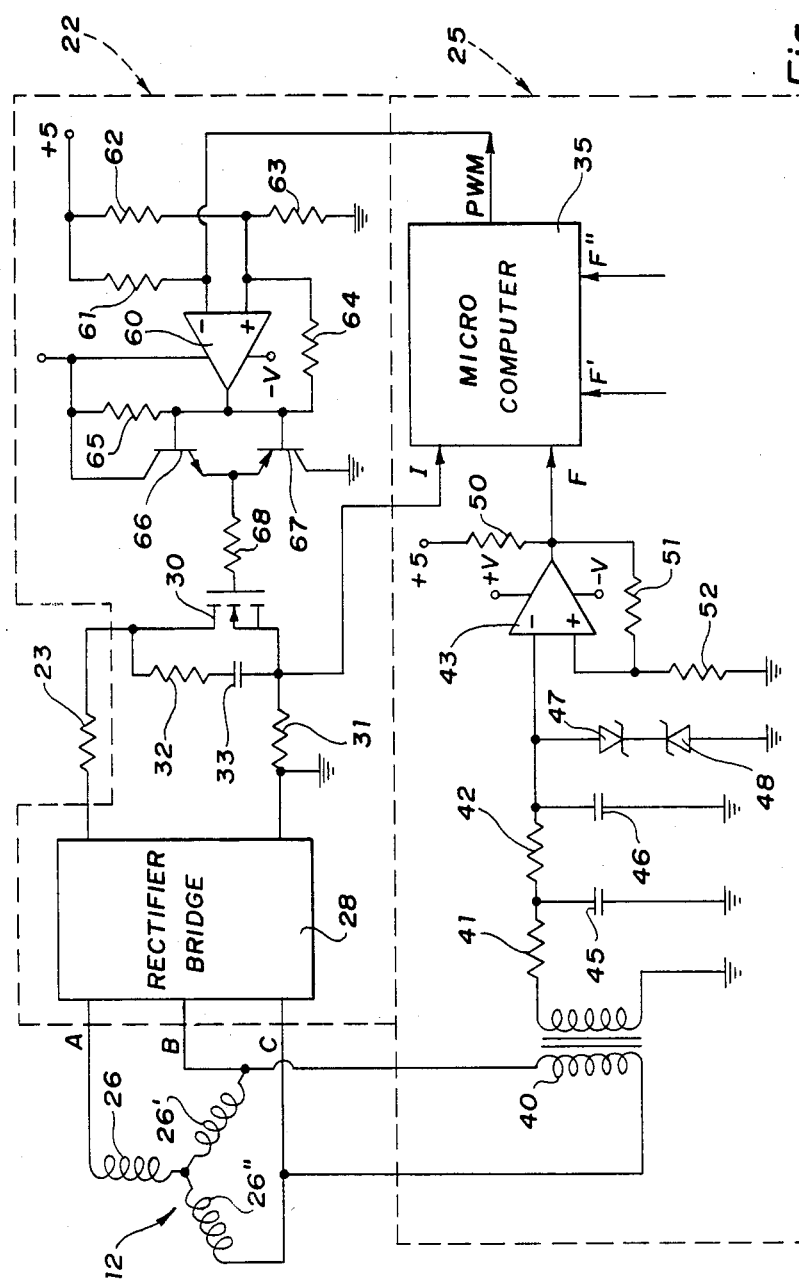
FIG. 2 is an electric circuit diagram showing part of the apparatus of FIG. 1 in more detail.

The electrical operation of the system is seen more clearly with reference to the electrical circuit of FIG. 2. The free ends of the three phase windings 26, 26' and 26" are connected by connectors A, B and C to a standard rectifier bridge 28. The output of rectifier bridge 28 is a single DC current provided to load resistor 23 in series with MOSFET 30 and series current sensing resistor 31 (25 amps at 50 mV, or 2 milliohms). A resistor 32 (50 ohms) and capacitor 33 (0.1 uF) in series are connected across MOSFET 30. The junction of rectifier bridge 28 and current sensing resistor 31 is grounded, so that the voltage across current sensing resistor 31, which has very low resistance, indicates the current therethrough. This voltage is provided, as current signal I, to a microcomputer 35 which is part of control 25.

Connectors B and C provide one phase of alternator 12 through a transformer 40 to a zero detecting circuit comprising two series resistors 41 (10K) and 42 (10K) to the inverting input of a comparator 43 with a capacitor 45 (0.33 uF) to ground from the junction of resistors 41 and 42, a capacitor 46 (0.015 uF) to ground from the inverting input of comparator 43 and back to back Zener diodes 47 and 48 to ground from the inverting input of comparator 43. Comparator 43 has +V and −V power supply rails, a tie up resistor 50 (3K) connected from the to +5 volts, a positive feedback resistor 51 (470K) connected from the output to the non-inverting input and a resistor 52 (10K) connected from the non-inverting input to ground. The output of comparator 43 is a zero crossing signal which provides a pulse to microcomputer 35 with every zero crossing of the voltage in a single phase of the alternator output to indicate the frequency and therefore the rattle space velocity of the suspension apparatus. A similar circuit, not shown, is applied to a second phase of the alternator across connectors A and C to generate a zero crossing signal F'; and yet another such circuit is applied to the third phase of the alternator across connectors A and B to generate zero crossing signal F'', each of signals F' and F'' also being provided to microcomputer 35. Microcomputer 35 includes a real time clock for determining the times of the zero crossings in signals F, F' and F''; and the times of successive zero crossings in each signal are stored temporarily. From the compared successive times in a single phase, the frequency of suspension travel is derived; and from the frequency is derived the rattle space velocity. Although the times between successive zero crossings of one phase would provide such a signal, resolution is improved by using the times between zero crossings of all three phases, since the updating is accomplished three times as often. The direction of rattle space velocity is determined from the order of phase zero crossings; and this is preferably determined with the phase of each new zero crossing detected.

The output of microcomputer 35 is a pulse width modulated switching voltage PWM which is provided to a power amplifying MOSFET driving circuit to switch MOSFET 30 and thus control the average power dissipated in load resistor 23 and thus the damping of the suspension. The PWM signal, at a frequency of 2 kHz, is provided to the inverting input of a comparator 60 having a resistor 61 (10K) connected to +5 volts. Resistors 62 (10K) and 63 (10K) across +5 volts form a voltage divider to provide a voltage less than +5 volts the non-inverting input of comparator 60, which input is connected through a positive feedback resistor 63 (100K) to the output thereof. The output of comparator 60 is connected through a tie up resistor 65 (1.5K) to +V and to the bases of series connected NPN bipolar transistor 66 and PNP bipolar transistor 67, transistors 66 and 67 having emitters connected together with collectors connected to +V and ground, respectively. The emitters of transistors 66 and 67 are connected through a resistor 68 (100 ohms) to the gate of MOSFET 30.

Figure 3:
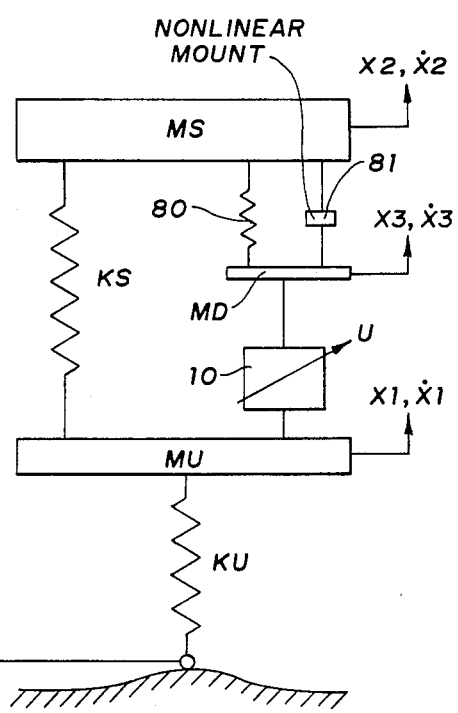
FIG. 3 shows an equivalent diagram of a preferred vehicle suspension apparatus including the damper and control of FIG. 1.

FIG. 3 shows, in a model diagram, an alternative mounting of damper 10 in the vehicle. Mass MU is the mass of the vehicle unsprung mass of one wheel and tire and its associated supporting members. Mass MU is connected to the road by a spring force KU representing the stiffness of the tire. A weight bearing spring KS supports the sprung mass MS of the vehicle on the unsprung mass MU; and R is the force exerted by the road on the tire. Damper 10 is represented by a variable damping force U in series with a small mass MD, which elements are connected between masses MS and MU in series with the parallel combination of a non-linear spring 80 and damper 81.

Non-linear spring 80 has a small spring constant in a small region around its center position and a greatly increasing spring constant outside this region in both directions. It may optionally be included for additional ride smoothing of small, high frequency road disturbances. Damper 81 is included because of the small amplitude freedom of motion introduced by the central region of non-linear spring 80. It is provided with a damping coefficient similar to that which it would have if it alone was used with suspension spring KS in a standard passive vehicle suspension. Larger suspension excursions will take the non-linear spring out of its central range into a stiff region; and the device will be essentially rigid. An example of a suitable non-linear spring is a bushing such as that used for a vehicle engine mount; and damper 81 may be combined in the same package. If spring 80 and damper 81 are used, the rattle space velocity is the velocity $X3-X1$ between the top of the damper MD and the unsprung mass MU.

Figure 4:
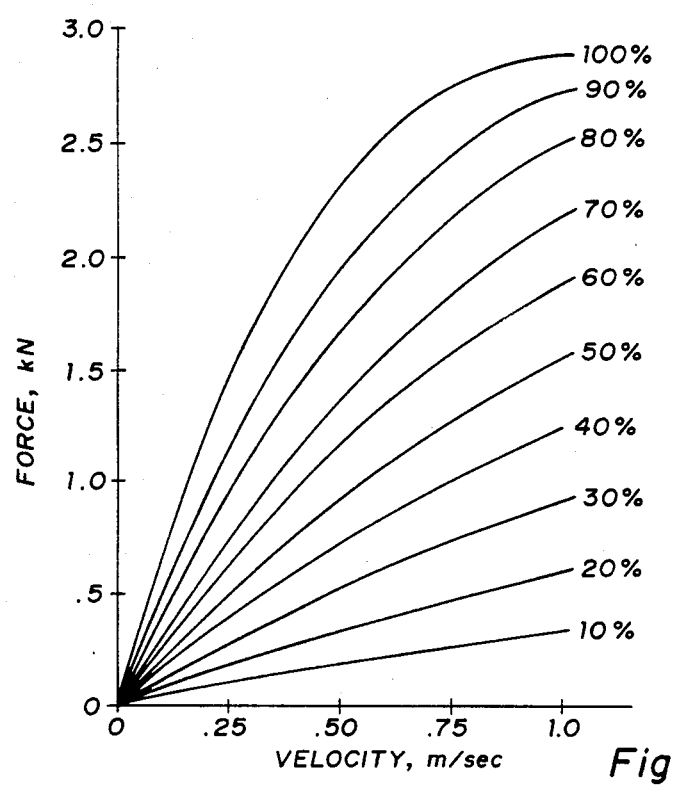
FIG. 4 shows a series of curves of force vs. velocity of suspension travel with different duty cycles in the chopping control circuit.
Figure 5:
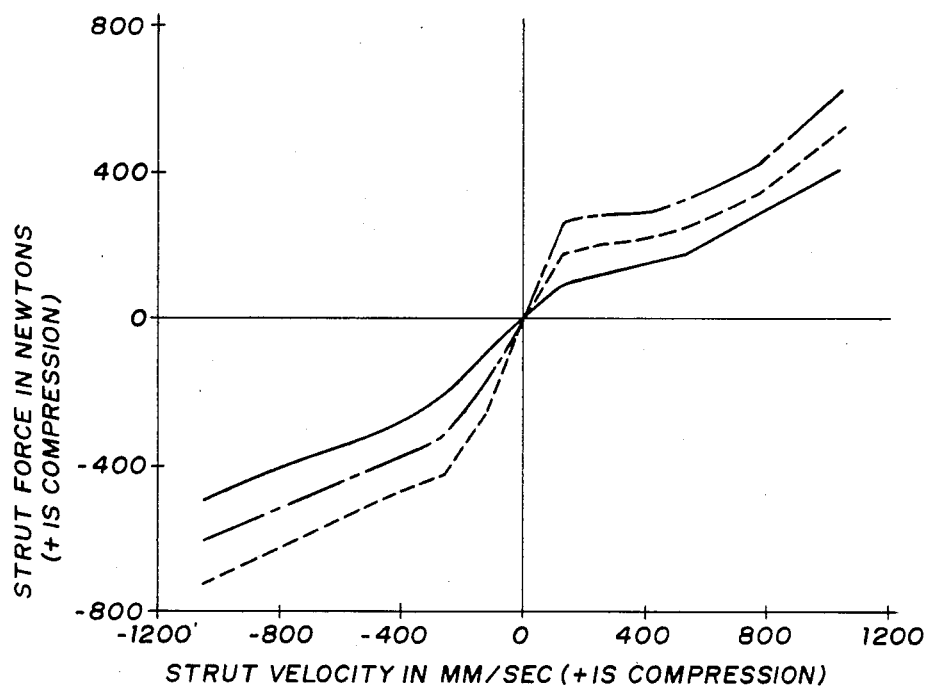
FIG. 5 shows a typical series of force vs. velocity curves for the suspension of a motor vehicle.

The normal mounting of the apparatus, however, does not include nonlinear spring 80 and damper 81. In the usual case, damper 10 connects the sprung mass MS and unsprung mass MU directly the rattle space velocity is the velocity $X2-X1$ between sprung mass MS and unsprung mass MU. In either case, the rattle space velocity may be related to desired damping force in a force/velocity curve or series of such curves, examples of which are shown in FIG. 5. Such curves are normally not symmetrical with up and down motion; that is why the direction of vertical travel is also important. It can be seen that, with the sensed information of rattle space velocity and direction of suspension travel, a desired damping may be read from the curve. Standard shock absorbers have such a curve or curves built permanently into their mechanical structure by means of suitably designed orifices and blowoff valves. The curves can be changed only by changes in the mechanical apparatus to change such orifices or blowoff valves; and this severely limits the speed with which the damping force may be changed. The apparatus described above, however, allows the lookup of a desired damping force in a lookup table based on the size and direction of the sensed rattle space velocity with an output pulse width modulation to the chopper apparatus to produce the desired damping force very quickly, since the portion of the apparatus which varies damping force is entirely electronic. This allows damping force control with a very fast response time. It further provides the opportunity for much more complex force/velocity relationships including multiple curve selection, with designs easily implemented in software lookup tables. If desired, the loop may be closed on damping force by using the sensed force information from the electric current to give a reading of true force and comparing this value to the desired damping force as read from the table to generate an error signal. The relationship between the damping force and rattle space velocity at various chopper duty cycles is shown in FIG. 4.

The implementation of the control in microcomputer 35 is comparatively simple. A stored program contains a program loop running with a loop time of about 1.8 milliseconds. During each loop, the microcomputer reads in the value of I through suitable A/D conversion apparatus. It further notes, as it occurs, the time of each successive zero crossing pulse of digital input signals F, F' and F'', takes the difference between the new time and the last time of zero crossing for the same phase and overwrites in memory the old time for that phase by the new value. The magnitude of rattle space velocity is thus determined for each phase separately by the time duration between consecutive pulses in each of the signals F, F' and F'' to avoid possible inaccuracies caused by circuit differences if phase is ignored in the time difference of consecutive zero crossings. With each new zero crossing, the microcomputer notes the alternator phase and compares it to the alternator phase of the last zero crossing to determine the direction of rattle space velocity. A lookup table is read with rattle space velocity magnitude and direction inputs, with the output value determining the PWM signal to the chopper apparatus. If the damping force feedback loop is implemented, there will probably be sufficient inductance in the circuit of alternator 12, rectifier bridge 28 and load resistor 23 that the duty cycle modulation of MOSFET 30 will produce an average DC current with a small ripple. If so, the current signal I read into microcomputer 35 is already averaged. If any additional averaging is required, it can be done with a standard digital averaging algorithm in microcomputer 35 applied to successive values of I.

The embodiments of the invention in which an exclusive property or privilege is claimed are defined as follows:

1. An electric, variable damping suspension for a motor vehicle having sprung and unsprung masses, the suspension comprising, in combination:
   a multiphase rotary electric alternator;
   a ball screw and nut apparatus connecting the sprung and unsprung masses and driving the alternator in one rotary direction and the other as the sprung and unsprung masses move relatively in one vertical direction or the other with a rattle space velocity;
   a rectifier bridge for converting the multiphase alternator output to a single DC current;
   an electric load;
   a switch for controlling the application of the DC current to the electric load;
   first circuit means responsive to at least a first phase of the multiphase alternator to sense the zero crossings of the first phase and generate therefrom a signal indicative of the magnitude of the rattle space velocity;
   second circuit means responsive to at least a second phase of the multiphase alternator to sense the zero crossings of the second phase and indicate therefrom, in relation to the zero crossings of the first phase, the direction of the rattle space velocity; and
   a chopping control circuit responsive to the signals from the first and second circuit means for controlling the switch in a variable duty cycle operation to vary the average current through the electric load and thus the damping force of the suspension.

2. The suspension of claim 1 further comprising third circuit means effective to sense the current through the electric load to generate therefrom a signal indicative of the actual damping force of the suspension.

3. The suspension of claim 1 in which the multiphase alternator has at least three phases and which further comprises third circuit means responsive to a third phase of the multiphase alternator to sense the zero crossings of the third phase, each of the first, second and third circuit means being effective to update the signal indicative of the magnitude of rattle space velocity from the zero crossings of its own associated phase, said signal being thus updated at three times the rate for a single such circuit for greater resolution, the second circuit means being effective to determine, from the identities of the alternator phases of successive zero crossings of any phase compared with stored expected consecutive phase identities, the direction of the rattle space velocity.

* * * * *